US012625701B2

(12) United States Patent
Guo et al.

(10) Patent No.: US 12,625,701 B2
(45) Date of Patent: May 12, 2026

(54) PROVIDING SELF-MANAGED OPERATORS

(71) Applicant: International Business Machines Corporation, Armonk, NY (US)

(72) Inventors: Yan Fen Guo, Beijing (CN); Chao Feng Wu, Beijing (CN); Hui Huang, Beijing (CN); Song Bai, Beijing (CN); Xiang Cai, Beijing (CN); Xiao Jian Lian, Beijing (CN); Leela Prasad Chitta, Dublin, CA (US)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 18/643,042

(22) Filed: Apr. 23, 2024

(65) Prior Publication Data
US 2025/0328339 A1     Oct. 23, 2025

(51) Int. Cl.
*G06F 21/00*     (2013.01)
*G06F 8/65*     (2018.01)
*G06F 8/71*     (2018.01)

(52) U.S. Cl.
CPC . *G06F 8/71* (2013.01); *G06F 8/65* (2013.01)

(58) Field of Classification Search
None
See application file for complete search history.

(56) References Cited

U.S. PATENT DOCUMENTS

| | | | | |
|---|---|---|---|---|
| 6,678,882 | B1 * | 1/2004 | Hurley | G06F 8/315 |
| | | | | 717/121 |
| 7,350,226 | B2 * | 3/2008 | Moriconi | G06F 21/577 |
| | | | | 726/1 |
| 9,135,000 | B2 * | 9/2015 | Weatherhead | G06F 8/36 |
| 10,374,978 | B2 | 8/2019 | Jaisinghani | |
| 11,074,091 | B1 * | 7/2021 | Nayakbomman | G06F 9/455 |
| 12,561,125 | B2 * | 2/2026 | Vohra | G06F 8/65 |

(Continued)

OTHER PUBLICATIONS

Hamada, Takeo. Dynamic role creation from role class hierarchy-security management of service session in dynamic service environment. Proceedings TINA '97—Global Convergence of Telecommunications and Distributed Object Computing. https://ieeexplore. ieee.org/stamp/stamp.jsp?tp=&arnumber=660720 (Year: 1997).*

(Continued)

*Primary Examiner* — Jeremiah L Avery
(74) *Attorney, Agent, or Firm* — Yee & Associates, P.C.

(57) ABSTRACT

Self-managed operators is provided. A set of sub-operators that a main operator depends on is selected from a plurality of predefined sub-operators based on an analysis of a new version of a custom resource definition in response to determining that a current version of the main operator does match a main operator version identified in the new version of the custom resource definition corresponding to the main operator based on the analysis of the custom resource definition. A sub-custom resource definition is generated for each respective sub-operator of the set of sub-operators that the main operator depends on based on the new version of the custom resource definition corresponding to the main operator. The set of sub-operators that the main operator depends on is launched automatically using the sub-custom resource definition of each respective sub-operator of the set of sub-operators.

20 Claims, 16 Drawing Sheets

(56)     References Cited

U.S. PATENT DOCUMENTS

| 2007/0294385 A1* | 12/2007 | Kapadekar | H04L 41/00 |
| | | | 709/223 |
| 2013/0152047 A1* | 6/2013 | Moorthi | G06F 8/71 |
| | | | 717/124 |
| 2016/0132805 A1* | 5/2016 | Delacourt | G06Q 10/00 |
| | | | 705/7.23 |
| 2016/0142482 A1* | 5/2016 | Mehta | H04L 67/1097 |
| | | | 709/203 |
| 2017/0034023 A1* | 2/2017 | Nickolov | H04L 43/0817 |
| 2019/0342162 A1* | 11/2019 | Bendre | H04L 67/1001 |
| 2021/0311763 A1* | 10/2021 | Beard | G06F 8/65 |
| 2021/0334085 A1* | 10/2021 | Vessels | H04W 12/35 |
| 2022/0050675 A1* | 2/2022 | Tamir | G06F 21/577 |
| 2022/0066764 A1 | 3/2022 | Rosenzwig et al. | |
| 2022/0329616 A1* | 10/2022 | O'Hearn | G06F 21/577 |
| 2022/0357938 A1 | 11/2022 | Lanford et al. | |
| 2022/0382539 A1* | 12/2022 | Gumashta | G06N 20/00 |
| 2023/0129217 A1 | 4/2023 | Bregman et al. | |
| 2023/0195444 A1* | 6/2023 | Vohra | G06F 8/60 |
| | | | 717/172 |
| 2023/0385044 A1 | 11/2023 | Antinori et al. | |
| 2024/0028412 A1 | 1/2024 | Xu et al. | |
| 2024/0289111 A1* | 8/2024 | Kaveri Poompatnam Chandrasekaran | G06F 8/65 |
| 2024/0361907 A1* | 10/2024 | Fetik | G06F 3/067 |

OTHER PUBLICATIONS

Agbariah, Saeed M. Policy exchange and management for Policy Compliance and Change Detection System in managed service in data networks. The 2014 International Symposium on Networks, Computers and Communications. https://ieeexplore.ieee.org/stamp/stamp.jsp?tp=&arnumber=6866524 (Year: 2014).*

Author unknown, "Best Practices Operator Lifecycle Manager," Operator Framework, 2024, 2 pages, operatorframework.io, accessed Mar. 28, 2024, https://olm.operatorframework.io/docs/best-practices/.

Author unknown, "Operand deployment lifecycle manager," GitHub, Feb. 8, 2024, 5 pages, github.com, accessed Mar. 28, 2024, https://github.com/IBM/operand-deployment-lifecycle-manager.

Author unknown, "Operator cannot be upgraded with the error 'Cannot update: CatalogSource was removed' while the CatalogSource exists in OpenShift 4," Red Hat Customer Portal, Dec. 14, 2023, 2 pages, redhat.com, accessed Apr. 9, 2024, https://access.redhat.com/solutions/6603001.

Author unknown, "Upgrading operators in offline environment," IBM Documentation, Jan. 25, 2024, ppp. 1-5, ibm.com, accessed Apr. 9, 2024, https://ibmdocs-test.dcs.ibm.com/docs/en/cloud-paks/cp-biz-automation/23.0.1?topic=2202-option-1-upgrading-operators-in-offline-environment.

* cited by examiner

COMPUTING ENVIRONMENT
100

OPERATOR LIFECYCLE
MANAGEMENT PROCESS
201

206    CONTAINER-BASED ENVIRONMENT

204    HOST NODE

202    MAIN OPERATOR

208    MANAGEMENT ROLE

212 — DETECT CUSTOM RESOURCE DEFINITION APPLIED/UPDATED

214 — ENSURE CURRENT OPERATOR VERSION MATCHES VERSION IDENTIFIED IN CUSTOM RESOURCE DEFINITION

216 — ANALYZE SUB-OPERATOR DEPENDENCIES

LAUNCH SUB-OPERATORS
218

UPDATE SUB-OPERATORS TO NEW VERSION
220

DELETE IDLE SUB-OPERATORS
222

210    FUNCTION ROLE

224 — DETECT CUSTOM RESOURCE DEFINITION APPLIED/UPDATED

226 — CREATE/UPDATE/DELETE SUB-CUSTOM RESOURCE DEFINITION

228 — CREATE/MANAGE/CONFIGURE APPLICATION COMPONENTS

230 — RECORD OPERATOR STATUS

232 — OPERATOR STATUS CONFIGURATION MAP

FIG. 2

OPERATOR STATUS
CONFIGURATION MAP
400

| OPERATOR IDENTIFIER 402 | OPERATOR STATUS 404 |
|---|---|
| MAIN-OPERATOR | RECONCILING |
| SUB-OPERATOR-1 | RECONCILING |
| SUB-OPERATOR-2 | RECONCILING |
| SUB-OPERATOR-3 | SUCCESS |
| SUB-OPERATOR-4 | SUCCESS |
| SUB-OPERATOR-5 | READY FOR DELETE |

FIG. 4

```
apiVersion: abc.ibm.com/v1
kind: ABCExample
metadata:
   name: abcexample
   labels:
      app.kubernetes.io/instance: abc
      app.kubernetes.io/managed-by: abc
      app.kubernetes.io/name: abc
      release: 1.0
spec:
   appVersion: 1.0
   shared_configuration:
      # new added parameters:
      subscription: ～ 602
         abc_channel: v1.0
         sub1_channel: v1.0
         sub2_channel: v2.0
      catalogsource: ～ 604
         abc_image: cp.icr.io/cp/abc/abcexample:version1
         abc_name: abc_catalogsource
         sub1_image: cp.icr.io/cp/sub/sub1:version1
         sub1_name: sub1_catalogsource
         sub2_image: cp.icr.io/cp/sub/sub2:version2
         sub2_name: sub2_catalogsource
```

CUSTOM RESOURCE DEFINITION 302

FIG. 6

```
kind: ClusterRole
apiVersion: rbac.authorization.k8s.io/v1
metadata:
name: main-operator
rules:
  ......
  - verbs:
        - create
        - get
        - list
        - patch
        - update
        - watch
   apiGroups:
    - operators.coreos.com
   resources:
    - catalogsources
```

MAIN OPERATOR PERMISSION CHANGE 700

FIG. 7

MAIN OPERATOR
CONFIGURATION TABLE
800

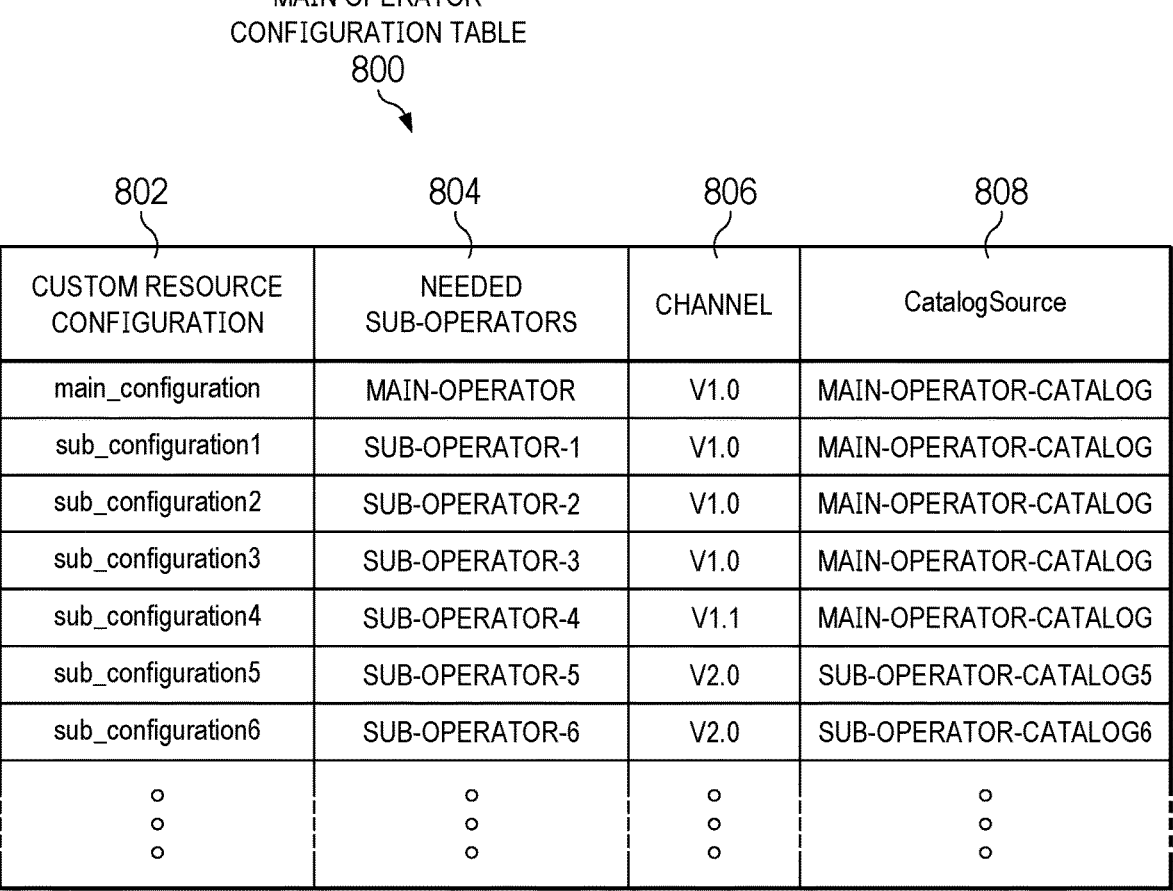

| CUSTOM RESOURCE CONFIGURATION | NEEDED SUB-OPERATORS | CHANNEL | CatalogSource |
|---|---|---|---|
| main_configuration | MAIN-OPERATOR | V1.0 | MAIN-OPERATOR-CATALOG |
| sub_configuration1 | SUB-OPERATOR-1 | V1.0 | MAIN-OPERATOR-CATALOG |
| sub_configuration2 | SUB-OPERATOR-2 | V1.0 | MAIN-OPERATOR-CATALOG |
| sub_configuration3 | SUB-OPERATOR-3 | V1.0 | MAIN-OPERATOR-CATALOG |
| sub_configuration4 | SUB-OPERATOR-4 | V1.1 | MAIN-OPERATOR-CATALOG |
| sub_configuration5 | SUB-OPERATOR-5 | V2.0 | SUB-OPERATOR-CATALOG5 |
| sub_configuration6 | SUB-OPERATOR-6 | V2.0 | SUB-OPERATOR-CATALOG6 |
| o<br>o<br>o | o<br>o<br>o | o<br>o<br>o | o<br>o<br>o |

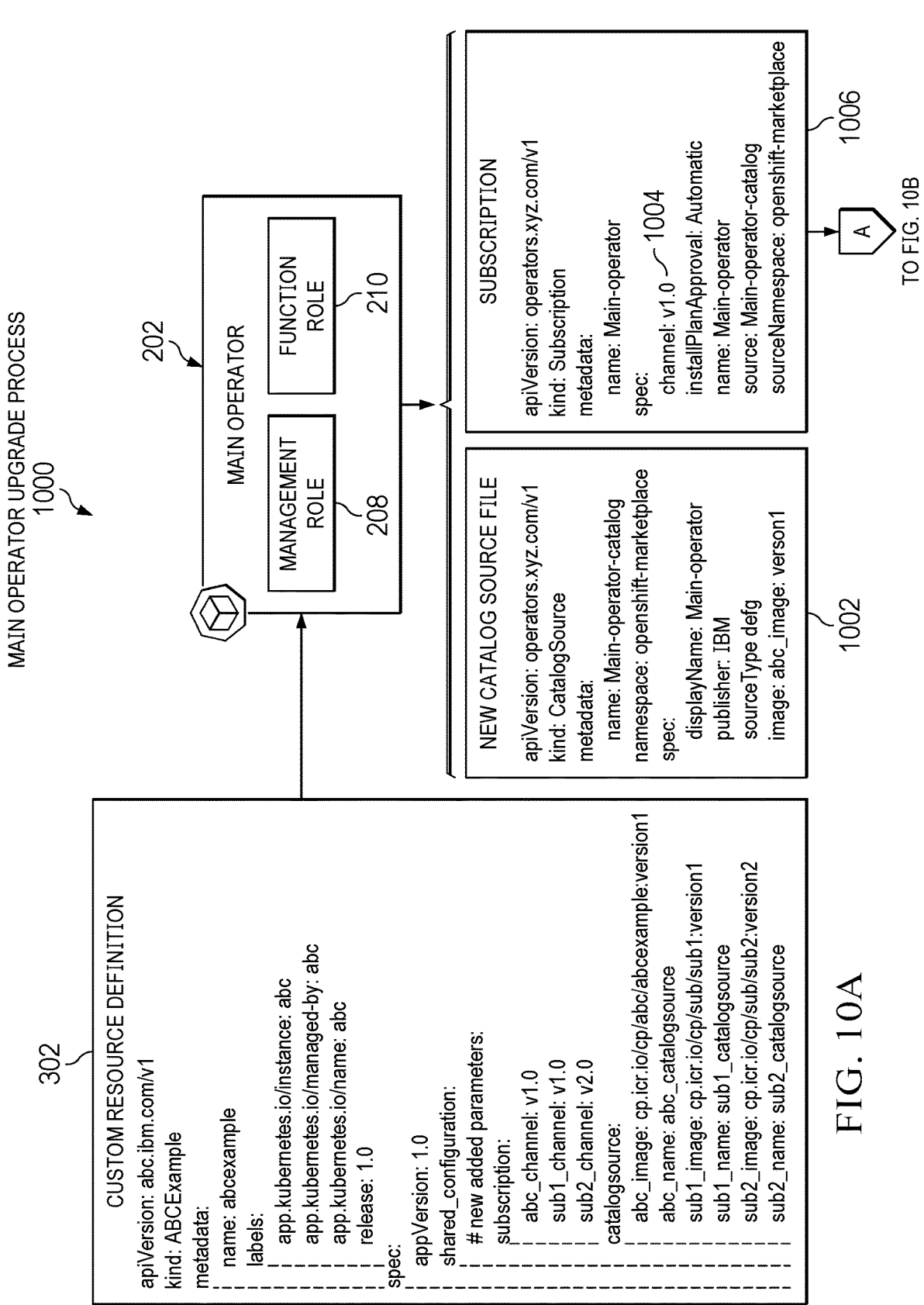

MAIN OPERATOR UPGRADE PROCESS
1000

202

MAIN OPERATOR

MANAGEMENT
ROLE
208

FUNCTION
ROLE
210

302

CUSTOM RESOURCE DEFINITION apiVersion: abc.ibm.com/v1
kind: ABCExample
metadata:
  name: abcexample
  labels:
    app.kubernetes.io/instance: abc
    app.kubernetes.io/managed-by: abc
    app.kubernetes.io/name: abc
    release: 1.0
spec:
  appVersion: 1.0
  shared_configuration:
    # new added parameters:
    subscription:
      abc_channel: v1.0
      sub1_channel: v1.0
      sub2_channel: v2.0
    catalogsource:
      abc_image: cp.icr.io/cp/abc/abcexample:version1
      abc_name: abc_catalogsource
      sub1_image: cp.icr.io/cp/sub/sub1:version1
      sub1_name: sub1_catalogsource
      sub2_image: cp.icr.io/cp/sub/sub2:version2
      sub2_name: sub2_catalogsource

NEW CATALOG SOURCE FILE apiVersion: operators.xyz.com/v1
kind: CatalogSource
metadata:
  name: Main-operator-catalog
  namespace: openshift-marketplace
spec:
  displayName: Main-operator
  publisher: IBM
  sourceType defg
  image: abc_image: verson1

1002

SUBSCRIPTION apiVersion: operators.xyz.com/v1
kind: Subscription
metadata:
  name: Main-operator
spec:
  channel: v1.0 ～1004
  installPlanApproval: Automatic
  name: Main-operator
  source: Main-operator-catalog
  sourceNamespace: openshift-marketplace

FROM FIG. 10A

A

1008

NEW MAIN OPERATOR V1.0

MANAGEMENT ROLE

FUNCTION ROLE

904

SUB-SUBSCRIPTION apiVersion: operators.xyz.com/v1
kind: Subscription
metadata:
    name: Sub-operator-1
spec:
    channel: v1.0
    installPlanApproval: Automatic
    name: sub-operator-1
    source: sub1_catalogsource
    sourceNamespace: openshift-marketplace

1010

NEW SUB-OPERATOR 1 V1.0

FUNCTION ROLE

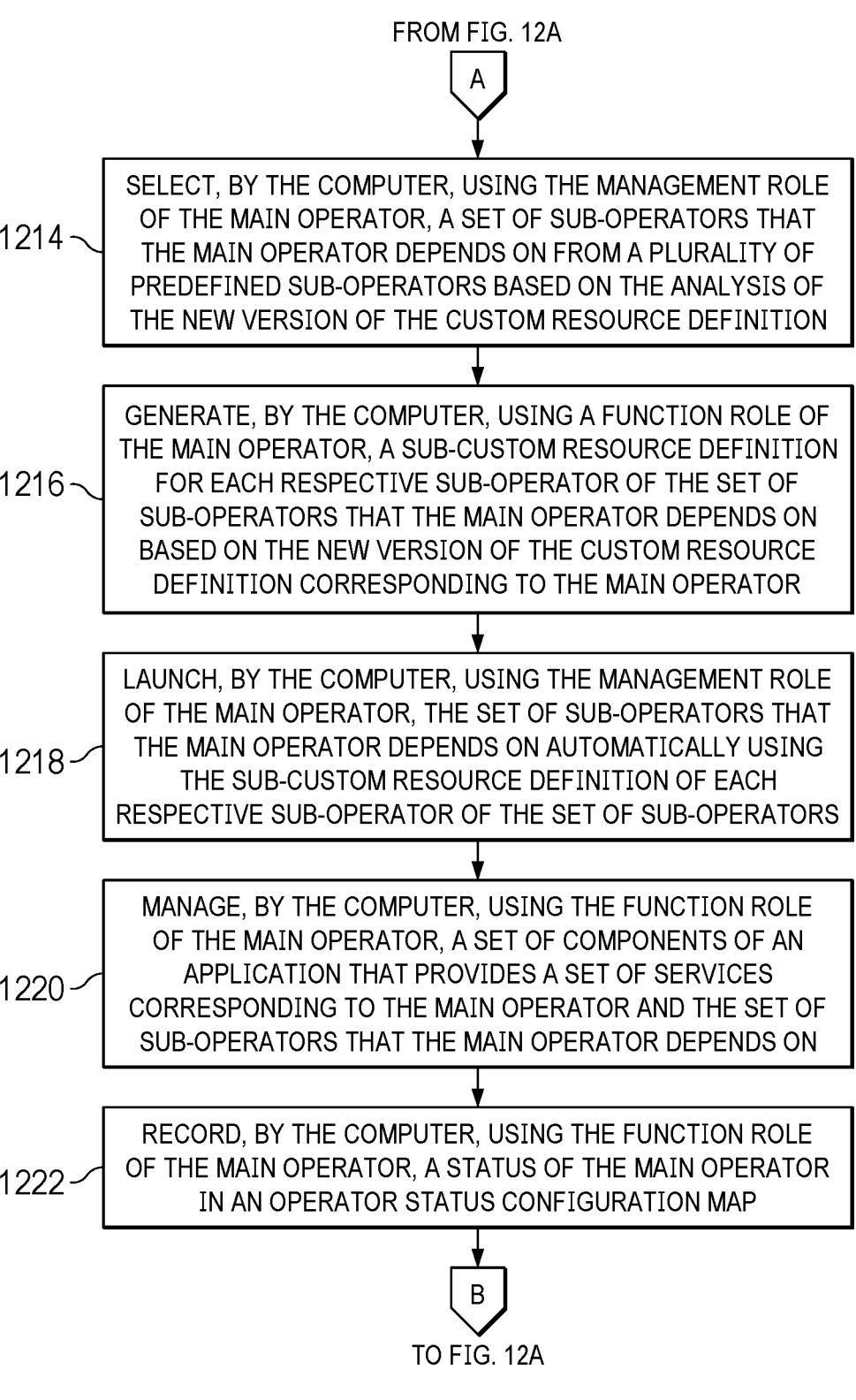

FROM FIG. 12A

A

1214 — SELECT, BY THE COMPUTER, USING THE MANAGEMENT ROLE OF THE MAIN OPERATOR, A SET OF SUB-OPERATORS THAT THE MAIN OPERATOR DEPENDS ON FROM A PLURALITY OF PREDEFINED SUB-OPERATORS BASED ON THE ANALYSIS OF THE NEW VERSION OF THE CUSTOM RESOURCE DEFINITION

1216 — GENERATE, BY THE COMPUTER, USING A FUNCTION ROLE OF THE MAIN OPERATOR, A SUB-CUSTOM RESOURCE DEFINITION FOR EACH RESPECTIVE SUB-OPERATOR OF THE SET OF SUB-OPERATORS THAT THE MAIN OPERATOR DEPENDS ON BASED ON THE NEW VERSION OF THE CUSTOM RESOURCE DEFINITION CORRESPONDING TO THE MAIN OPERATOR

1218 — LAUNCH, BY THE COMPUTER, USING THE MANAGEMENT ROLE OF THE MAIN OPERATOR, THE SET OF SUB-OPERATORS THAT THE MAIN OPERATOR DEPENDS ON AUTOMATICALLY USING THE SUB-CUSTOM RESOURCE DEFINITION OF EACH RESPECTIVE SUB-OPERATOR OF THE SET OF SUB-OPERATORS

1220 — MANAGE, BY THE COMPUTER, USING THE FUNCTION ROLE OF THE MAIN OPERATOR, A SET OF COMPONENTS OF AN APPLICATION THAT PROVIDES A SET OF SERVICES CORRESPONDING TO THE MAIN OPERATOR AND THE SET OF SUB-OPERATORS THAT THE MAIN OPERATOR DEPENDS ON

1222 — RECORD, BY THE COMPUTER, USING THE FUNCTION ROLE OF THE MAIN OPERATOR, A STATUS OF THE MAIN OPERATOR IN AN OPERATOR STATUS CONFIGURATION MAP

PROVIDING SELF-MANAGED OPERATORS

BACKGROUND

The disclosure relates generally to container-based environments and more specifically to managing operators in a container-based environment.

A container-based environment, architecture, platform, or the like, such as, for example, Kubernetes® (a registered trademark of the Linux Foundation of San Francisco, CA, USA), provides a structural design for automating deployment, scaling, and operations of containers across host nodes. A host node is a machine, either physical or virtual, where containers (i.e., applications) are deployed. A container is a version of a container image and is ready to run as an application corresponding to a service. The container includes the environment for the application to run (e.g., file systems, environment variables, port mappings, and the like).

A resource in a container-based environment stores a set of application programming interface (API) objects of a certain kind (e.g., a built-in pod resource contains a set of pod objects). A custom resource enables a user to create API objects. A custom resource allows the user to extend capabilities of a container-based environment beyond the default installation by adding any kind of API object useful to an application. In other words, a custom resource represents a customization of a particular container-based environment installation. A custom resource definition defines a custom resource. Custom resources can appear and disappear in a running cluster of host nodes through dynamic registration, and cluster administrators can update custom resources independently of the cluster itself.

A computer instruction describes an operation. For example, an operator issues a specific instruction to a computer to carry out an operation on one or more operands. An operand is the part of a computer instruction which specifies what data is to be manipulated or operated on, while at the same time representing the data.

SUMMARY

According to one illustrative embodiment, a computer-implemented method for providing self-managed operators is provided. In response to a computer, using a management role of a main operator, determining that a current version of the main operator does match a main operator version identified in a new version of a custom resource definition corresponding to the main operator based on an analysis of the custom resource definition, the computer, using the management role of the main operator, selects a set of sub-operators that the main operator depends on from a plurality of predefined sub-operators based on the analysis of the new version of the custom resource definition. The computer, using a function role of the main operator, generates a sub-custom resource definition for each respective sub-operator of the set of sub-operators that the main operator depends on based on the new version of the custom resource definition corresponding to the main operator. The computer, using the management role of the main operator, launches the set of sub-operators that the main operator depends on automatically using the sub-custom resource definition of each respective sub-operator of the set of sub-operators. According to other illustrative embodiments, a computer system and computer program product for providing self-managed operators are provided.

BRIEF DESCRIPTION OF THE DRAWINGS

FIG. 2 is a diagram illustrating an example of an operator lifecycle management process in accordance with an illustrative embodiment;

FIG. 4 is a diagram illustrating an example of an operator status configuration map in accordance with an illustrative embodiment;

FIG. 6 is a diagram illustrating an example of a custom resource definition in accordance with an illustrative embodiment;

FIG. 7 is a diagram illustrating an example of a main operator permission change in accordance with an illustrative embodiment;

FIG. 8 is a diagram illustrating an example of a main operator configuration table in accordance with an illustrative embodiment;

FIGS. 10A-10B are a diagram illustrating an example of a main operator upgrade process in accordance with an illustrative embodiment;

FIGS. 12A-12B are a flowchart illustrating a process for providing self-managed operators in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
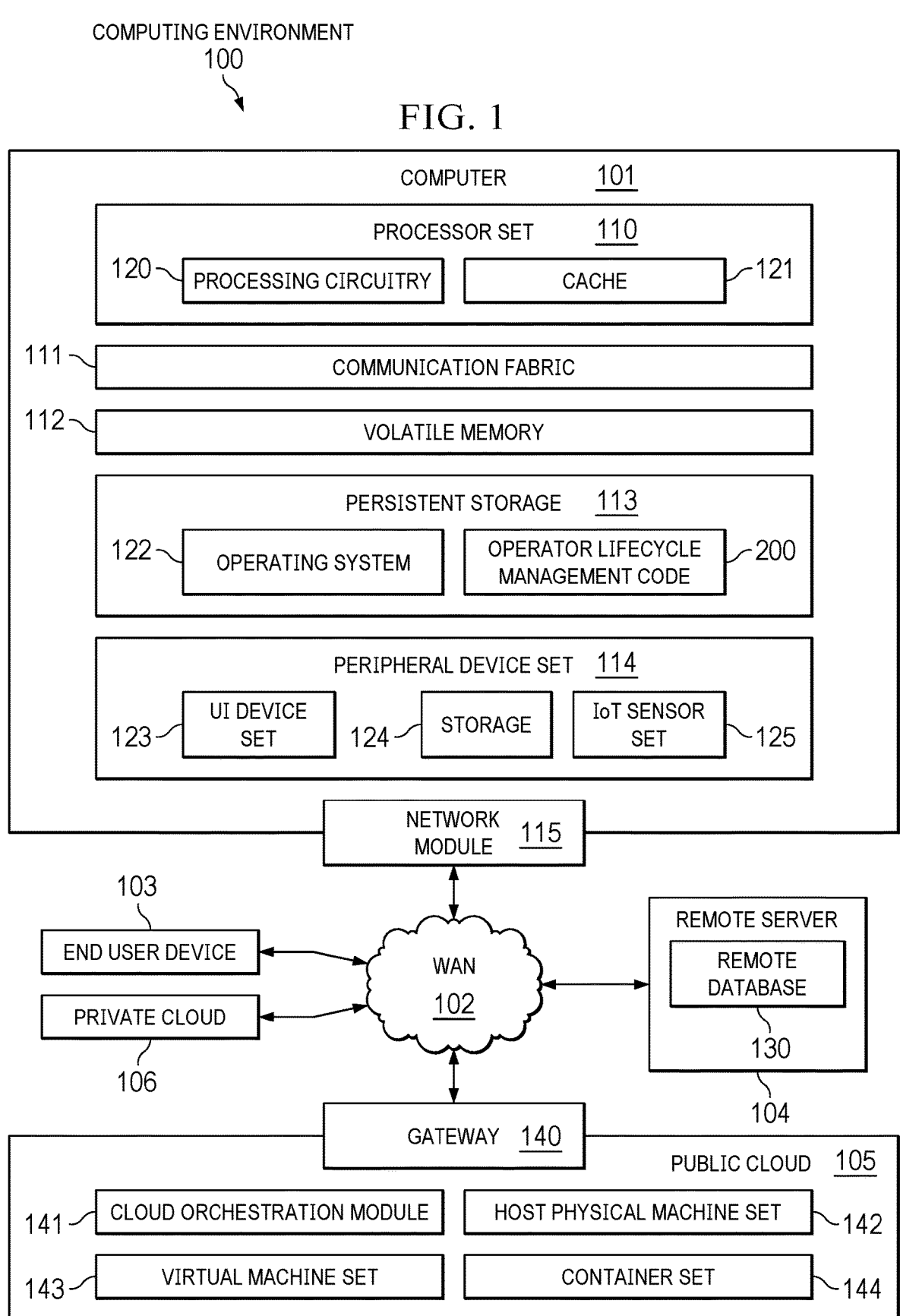
FIG. 1 is a pictorial representation of a computing environment in which illustrative embodiments may be implemented.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of a container-based environment for the execution of at least some of the computer code involved in performing the inventive methods of illustrative embodiments, such as operator lifecycle management code 200. For example, operator lifecycle management code 200 enables operators to be self-managed in accordance with custom resource definitions with newly added subscription and catalog source parameters and adding a management role to the operators for automatic version upgrades, which makes operator installation, upgrade, and restore easier and faster while consuming fewer system resources by only launching sub-operators needed by the operator so that no idle sub-operators are consuming system resources.

In addition to operator lifecycle management code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and operator lifecycle management code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in operator lifecycle management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a cluster administrator utilizing the operator lifecycle management services provided by computer 101), and may take any of the forms discussed above in connection with computer 101. EUD 103 typically receives helpful and useful data from the operations of computer 101. For example, in a hypothetical case where computer 101 is designed to provide an operator lifecycle management recommendation to the end user, this recommendation would typically be communicated from network module 115 of computer 101 through WAN 102 to EUD 103. In this way, EUD 103 can display, or otherwise present, the operator lifecycle management recommendation to the end user. In some embodiments, EUD 103 may be a client device, such as a thin client, heavy client, mainframe computer, desktop computer, laptop computer, tablet computer, smart phone, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide an operator lifecycle management recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Typically, a user needs multiple operators to manage different applications in a container-based environment (e.g., Kubernetes). An operator packages, deploys, and manages an application of the container-based environment for a user. An operator lifecycle manager is an open source toolkit to manage operators. An operand deployment lifecycle manager is an extension of an operator lifecycle manager tailored specifically for managing operands within the container-based environment. Services that utilize multiple operators to deploy products as packages (e.g., IBM Cloud Pak® for Business Automation) design, build, run, and automate services to scale applications and execute an automation strategy. IBM Cloud Pak is a registered trademark of the International Business Machines Corporation, Armonk, NY, USA. IBM Cloud Pak for Business Automation includes 1 main operator and 8 sub-operators, which current operator lifecycle managers automatically launch all 9 operators (i.e., the main operator and all 8 sub-operators) due to operator dependencies defined in current operator lifecycle managers.

Current operator lifecycle managers automatically launch all operators because an operator needs to be ready to run before a user applies the custom resource definition corresponding to that operator. However, not all operators are typically in use because the user usually does not install all operands which are managed by these operators. Before the user applies the corresponding customer resource definitions, current operator lifecycle managers do not know which operators will be involved so current operator lifecycle managers just launch all operators. Current operator lifecycle managers do not support automatically launching an individual operator during runtime.

As an illustrative example, when installing the main operator, current operator lifecycle managers will launch all sub-operators, each sub-operator providing a particular service or microservice corresponding to an application associated with the main operator. However, not all sub-operators may be utilized, and idle sub-operators still consume system resources. For example, maybe only 2 sub-operators of 8 sub-operators are in use, but the 6 idle sub-operators are still consuming system resources, which decreases system performance. Manually maintaining and upgrading an operator build, as well as sub-operator dependencies of the operator, is becoming a challenge.

For example, when upgrading or restoring a main operator, a user needs to manually upgrade or restore the main operator first. For example, the user needs to upgrade the main operator using a target catalog source file, stop the existing container corresponding to the main operator, change the channel that maps to a specific version of the main operator in the subscription, verify that all sub-operators corresponding to the main operator are upgraded to the new version, and apply new custom resource definitions to the main operator and sub-operators. However, because of sub-operator dependencies of the main operator, manual upgrade or restore by the user can result in failure. For example, the main operator is subject to all sub-operator dependencies and if one sub-operator is not launched or fails, then the main operator fails as well.

Illustrative embodiments take into account and address the issues associated with current operator lifecycle managers by removing the operator dependencies defined in current operator lifecycle managers. For example, illustrative embodiments enable each operator to be an independent self-managed operator in accordance with the operator lifecycle management code of illustrative embodiments. Currently, all operator dependencies are defined in existing operator lifecycle managers. The operator lifecycle management code of illustrative embodiments enables each individual operator to manage its own sub-operator dependencies during custom resource execution time.

By utilizing illustrative embodiments, a user does not need to be concerned with sub-operators needed by a main operator, making the installation process simpler. A user only needs to make sure that the latest catalog source file is installed in the container-based environment, and only needs to install one main operator. Then, the main operator self-manages itself according to a user-applied custom resource definition with newly added subscription and catalog source parameters containing information for automatic operator upgrade or restore.

Illustrative embodiments add a management role in the main operator, which enables the main operator to automatically deploy and run a set of sub-operators, which the management role selects from a plurality of defined sub-operators, in accordance with a custom resource definition corresponding to the main operator. The custom resource definition is a file containing parameters for configuring the main operator, providing the functionality of the main operator.

The management role of the main operator ensures that the current version of the main operator matches the version identified in the custom resource definition corresponding to the main operator. In addition, the management role automatically launches and manages any sub-operator corresponding to the main operator. For example, when deleting a sub-operator, the management role determines the current status of the sub-operator and ensures that the sub-operator has performed its removal work (e.g., delete deployment from the corresponding container and any corresponding resources).

The main operator also includes a function role in addition to the management role. The function role records the current status of the main operator in a centralized operator status configuration map. In addition, the function role generates, configures, and manages assigned application components for the user in accordance with a set of predefined criteria. As a result, illustrative embodiments provide an improved installation, upgrade, and restore process for main operators by enabling the main operators to automatically change version in accordance with corresponding custom resource definition version changes.

Thus, illustrative embodiments enable main operators to be self-managed in accordance with user-applied custom resource definitions by removing operator dependency relationships from current operator lifecycle managers and adding a management role to the operators for automatic version upgrades, which makes operator installation, upgrade, and restore easier and faster while consuming fewer system resources. Because illustrative embodiments only generate and launch sub-operators needed by the main operator, no idle sub-operators are consuming resources of the container-based environment. This is in contrast with current operator lifecycle managers that automatically generate and deploy all sub-operators even though some of those sub-operators are not needed by the main operator.

Thus, illustrative embodiments provide one or more technical solutions that overcome a technical problem with current operator lifecycle managers automatically deploying all sub-operators even though some of the sub-operators are not needed by the main operator wasting container-based environment resources. As a result, these one or more technical solutions provide a technical effect and practical application in the field of container-based environments.

With reference now to FIG. 2, a diagram illustrating an example of an operator lifecycle management process is depicted in accordance with an illustrative embodiment. Operator lifecycle management process 201 is implemented in main operator 202. Main operator 202 is implemented by operator lifecycle management code 200 in FIG. 1.

In this example, main operator 202 is located in host node 204. Host node 204 may be, for example, computer 101 or one of host physical machine set 142 in FIG. 1. Host node 204 is located in container-based environment 206. Container-based environment 206 may be, for example, computing environment 100 in FIG. 1. However, it should be noted that container-based environment 206 is intended as an example only and not as a limitation on illustrative embodiments. For example, container-based environment can include any number of computers, host nodes, main operators, and other devices and components not shown.

A user installs main operator 202 on host node 204 in container-based environment 206. Main operator 202 includes two different roles, management role 208 and function role 210.

At 212, when management role 208 detects that a user has applied or updated a custom resource definition corresponding to main operator 202, management role 208, at 214, automatically ensures that the current version of main operator 202 matches the version identified in the custom resource definition. Furthermore, at 216, management role 208 also analyzes the custom resource definition to identify the sub-operator dependencies of main operator 202. Based on the analysis of the custom resource definition corresponding to main operator 202, management role 208 performs at least one of launching a set of sub-operators, at 218, that main operator 202 depends on, updates the set of sub-operators to the new version at 220, and deletes idle sub-operators at 222.

Main operator 202 utilizes function role 210 to perform predefined deployment and maintenance work for the user to provide a working operator system. For example, at 224, function role 210 also detects whether the user has applied or updated the custom resource definition corresponding to main operator 202. At 226, based on detecting that the user has either applied or updated the custom resource definition corresponding to main operator 202, function role 210 either creates, updates, or deletes sub-custom resource definitions corresponding to the set of sub-operators that main operator 202 depends on. Further, at 228, function role 210 either creates, manages, or configures components of an application, which provide a service or microservice, corresponding to main operator 202. Moreover, at 230, function role 210 records a status of main operator 202 in operator status configuration map 232.

Also, it should be noted that each respective sub-operator includes a function role as well. The function role of each respective sub-operator records the status of its corresponding sub-operator in operator status configuration map 232 in order for management role 208 to know the current status of each respective sub-operator.

Figure 3:
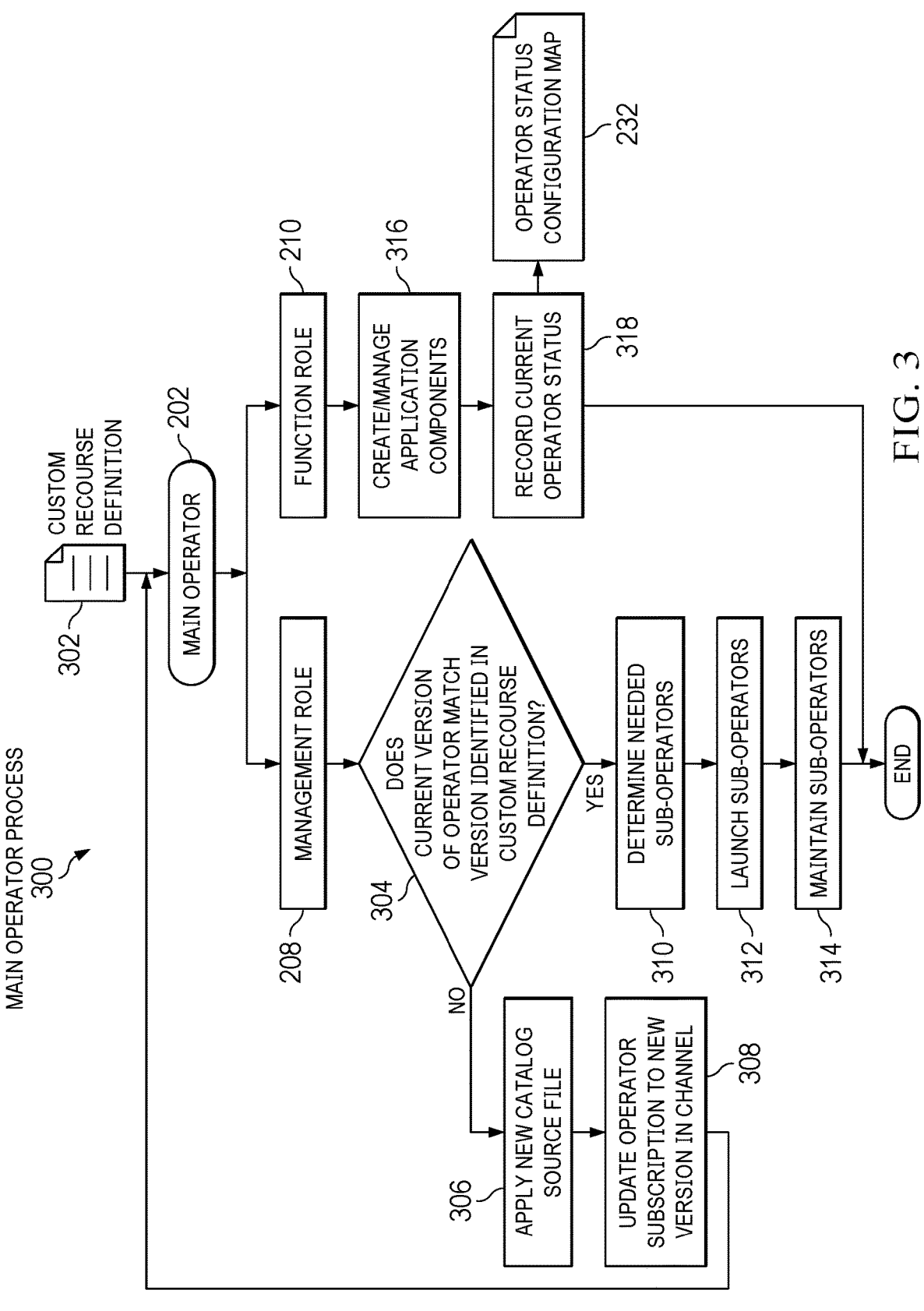
FIG. 3 is a diagram illustrating an example of a main operator process in accordance with an illustrative embodiment.

With reference now to FIG. 3, a diagram illustrating an example of a main operator process is depicted in accordance with an illustrative embodiment. Main operator process 300 is implemented in main operator 202, which includes management role 208 and function role 210. It should be noted that main operator 202 self-manages main operator process 300. In other words, main operator 202, using management role 208, ensures that the current version of main operator 202 matches the version identified in custom resource definition 302, which a user applied to main operator 202.

For example, at 304, if management role 208 determines that the current version of main operator 202 does not match the version identified in custom resource definition 302, then, at 306, management role 208 automatically retrieves and applies a new catalog source file that defines main operator 202 to upgrade the current version of main operator 202 to the version identified in custom resource definition 302. A catalog source file represents a store of metadata for installing an operator and the sub-operator dependencies of that operator. In addition, at 308, management role 208 updates the subscription of main operator 202 to the new version in the channel of the subscription.

If, at 304, management role 208 determines that the current version of main operator 202 does match the version identified in custom resource definition 302, then, at 310, management role 208 determines a set of sub-operators needed by main operator 202 based on information contained in custom resource definition 302. Management role 208 selects the set of sub-operators from a plurality of predefined sub-operators. Then, at 312, management role 208 automatically launches the set of sub-operators needed by main operator 202 without launching any other sub-operators of the plurality of predefined sub-operators, thereby preventing unnecessary resource consumption by any of the other sub-operators of the plurality of predefined sub-operators.

Concurrently, main operator 202, utilizing function role 210, generates a sub-custom resource definition for each respective sub-operator of the set of sub-operators to consume and use. Further, at 316, function role 210 creates and manages components of the application corresponding to main operator 202. Furthermore, function role 210 records the current status of main operator 202 in operator status configuration map 232.

With reference now to FIG. 4, a diagram illustrating an example of an operator status configuration map is depicted in accordance with an illustrative embodiment. Operator status configuration map 400 is implemented in a computer, such as computer 101 in FIG. 1, host node 204 in FIG. 2, or a different computer or host node. Operator status configuration map 400 includes operator identifier 402 and operator status 404.

Operator status configuration map 400 is a centralized operator status configuration map containing the status of a main operator, such as main operator 202, and the set of sub-operators that the main operator depends on. In this example, the set of sub-operators includes sub-operators 1-5 selected from all predefined sub-operators.

Operator identifier 402 uniquely identifies the main operator and each respective sub-operator. Operator status 404 can be, for example, one of "reconciling," "success," and "ready for delete." Reconciling means that a sub-operator is in the process of reconciling and maintaining application components (e.g., ensuring, on a defined time interval basis, that the services or microservices provided by the application corresponding to the main operator are working properly). Success means that the sub-operator has successfully finished a reconciling process and is waiting for the next reconciling process to start based on the defined time interval. Ready for delete means that the sub-operator has uninstalled its corresponding application components associated with the main operator, the sub-operator has completed its clean-up work (e.g., deleted the sub-operator's deployment from its corresponding container and any corresponding resources), it is idle now, and the main operator can now delete the sub-operator. A function role, such as function role 210, of the main operator records the current status of a particular sub-operator as ready for delete when a management role, such as management role 208, of the main operator deletes the sub-custom resource definition corresponding to that particular sub-operator.

Figure 5A:
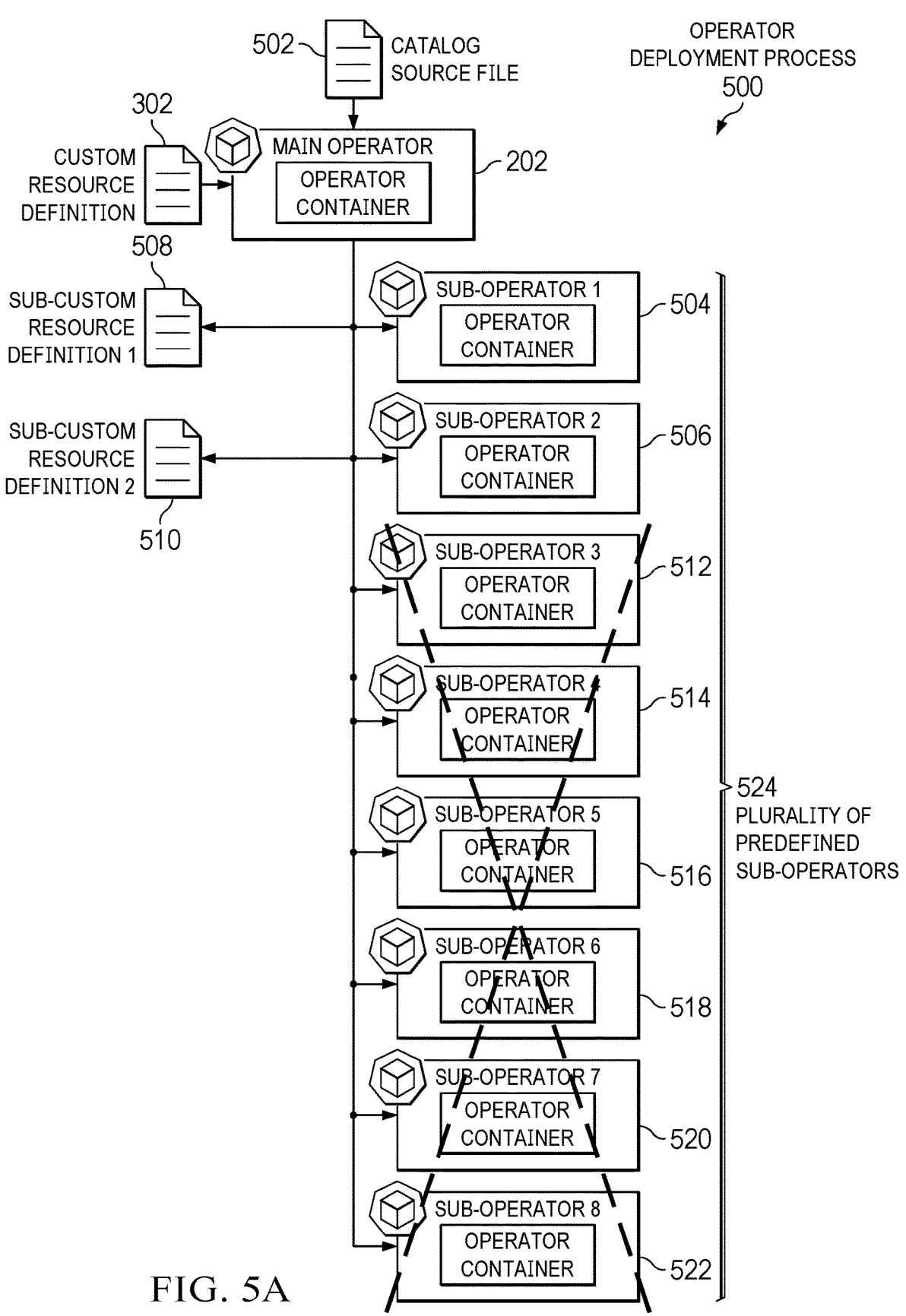
FIGS. 5A-5B are a diagram illustrating an example of an operator deployment process in accordance with an illustrative embodiment.
Figure 5B:
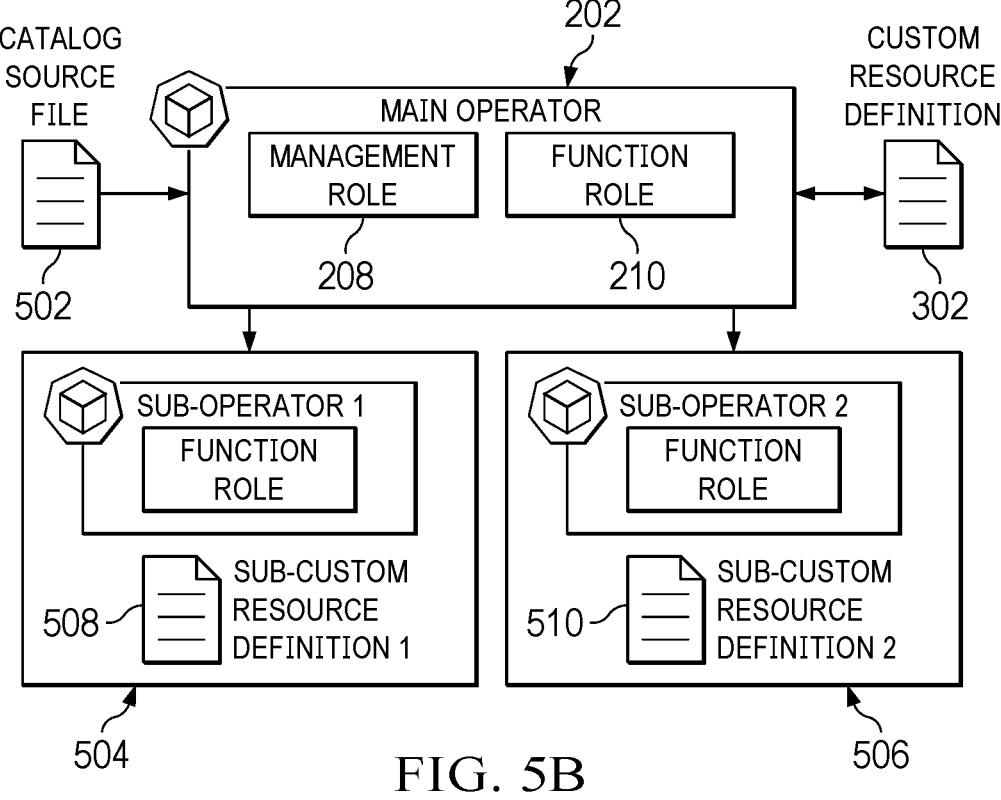

With reference now to FIGS. 5A-5B, a diagram illustrating an example of an operator deployment process is depicted in accordance with an illustrative embodiment. Operator deployment process 500 is implemented in a computer, such as, for example, computer 101 in FIG. 1 or host node 204 in FIG. 2, using operator lifecycle management code 200 in FIG. 1.

A user deploys main operator 202 on the computer using catalog source file 502. Main operator 202 includes management role 208 and function role 210. In response to the user deploying custom resource definition 302 on the computer, main operator 202, using management role 208, analyzes custom resource definition 302 to identify a set of sub-operators that main operator 202 depends on to provide a service corresponding to an application associated with main operator 202. In this example, the set of sub-operators that main operator 202 depends on includes sub-operator 1 504 and sub-operator 2 506.

In response to identifying sub-operator 1 504 and sub-operator 2 506 as the set of sub-operators that main operator 202 depends on, main operator 202, using function role 210, generates sub-custom resource definition 1 508 and sub-custom resource definition 2 510 based on custom resource definition 302. Then, main operator 202, utilizing management role 208, automatically generates and deploys sub-operator 1 504 and sub-operator 2 506 on the computer.

It should be noted that sub-operator 1 504, sub-operator 2 506, sub-operator 3 512, sub-operator 4 514, sub-operator 5 516, sub-operator 6 518, sub-operator 7 520, and sub-operator 8 522 comprise plurality of predefined sub-operators 524. However, it should also be noted that plurality of predefined sub-operators 524 is intended as an example only. For example, plurality of predefined sub-operators 524 can represent any number of predefined sub-operators. Illustrative embodiments do not automatically deploy all of plurality of predefined sub-operators 524 (i.e., sub-operator 3 512, sub-operator 4 514, sub-operator 5 516, sub-operator 6 518, sub-operator 7 520, and sub-operator 8 522 in this example) because illustrative embodiments remove all sub-operator dependencies from operator lifecycle management code 200, which controls the functionality of management role 208 and function role 210. In contrast, current operator lifecycle managers would automatically deploy all of plurality of predefined sub-operators 524. By illustrative embodiments not automatically deploying sub-operator 3 512, sub-operator 4 514, sub-operator 5 516, sub-operator 6 518, sub-operator 7 520, and sub-operator 8 522, illustrative embodiment save consumption of computer resources, thus increasing computer performance.

With reference now to FIG. 6, a diagram illustrating an example of a custom resource definition is depicted in accordance with an illustrative embodiment. Custom resource definition 302 includes new added parameters subscription 602 and catalog source 604. New added parameters subscription 602 and catalog source 604 contain information (e.g., identification of most recent version, container image, catalog source file, and the like) needed for upgrade or restore of a main operator, such as main operator 202. With the addition of the information in new added parameters subscription 602 and catalog source 604, the main operator can self-manage by automatically upgrading and launching sub-operator dependencies. It should be noted that the version of the main operator and a version of one or more sub-operators can be independent of one another.

With reference now to FIG. 7, a diagram illustrating an example of a main operator permission change is depicted in accordance with an illustrative embodiment. Main operator permission change 700 is implemented in a main operator, such as main operator 202. Main operator permission change 700 provides needed operator cluster role-related catalog source file permission. In other words, the main operator needs this permission to automatically upgrade to the newest version using a catalog source file, such as catalog source file 502.

With reference now to FIG. 8, a diagram illustrating an example of a main operator configuration table is depicted in accordance with an illustrative embodiment. Main operator configuration table 800 is implemented in main operator, such as main operator 202. The main operator generates and maintains main operator configuration table 800. Main operator configuration table 800 includes custom resource configuration 802, needed sub-operators 804, channel 806, and catalog source 808. Main operator configuration table 800 records which configuration is needed for which sub-operator. It should be noted that different configurations involve different sub-operators.

Figure 9:
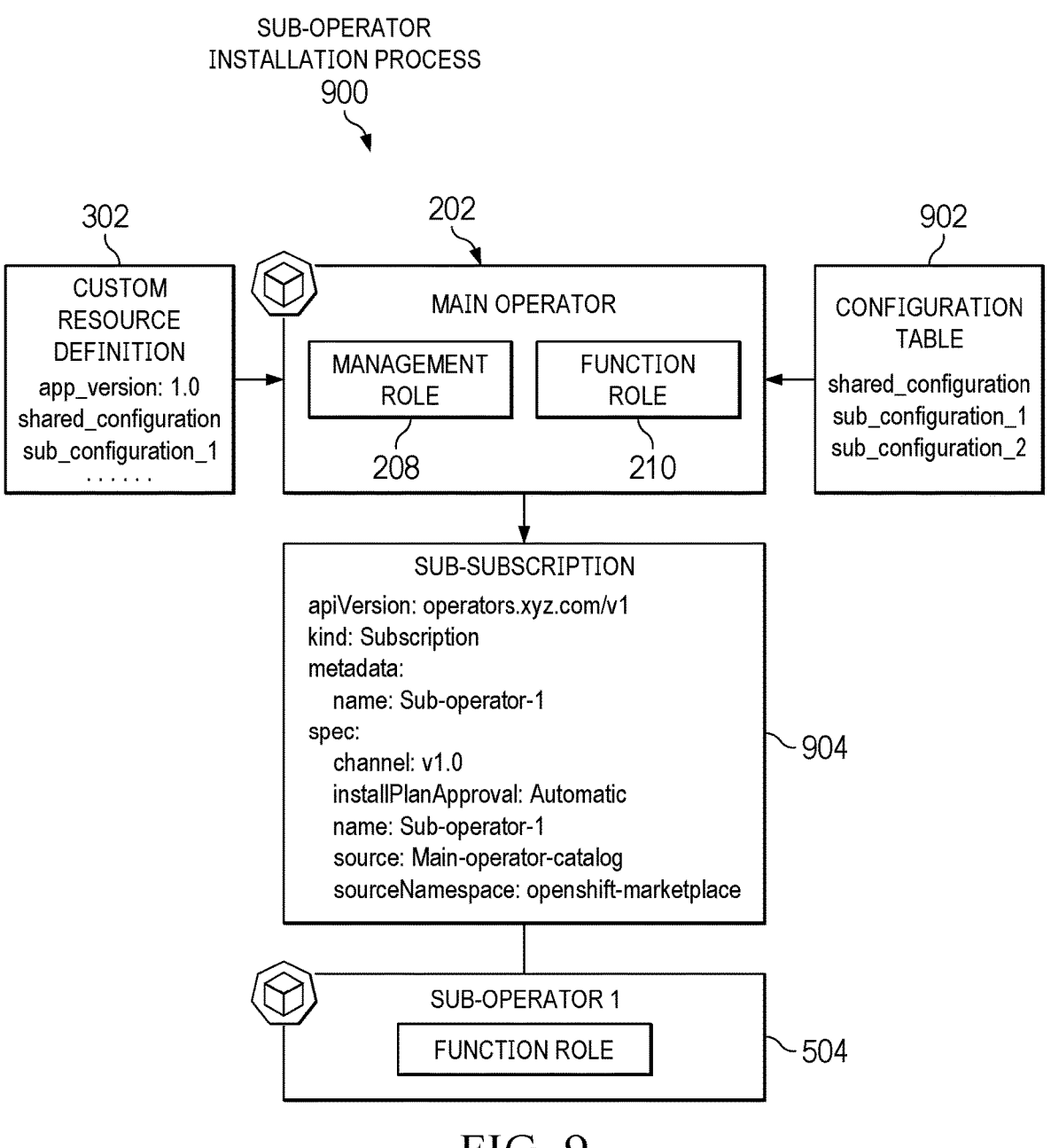
FIG. 9 is a diagram illustrating an example of a sub-operator installation process in accordance with an illustrative embodiment.

With reference now to FIG. 9, a diagram illustrating an example of a sub-operator installation process is depicted in accordance with an illustrative embodiment. Sub-operator installation process 900 is implemented in main operator 202, which includes management role 208 and function role 210.

Main operator 202, utilizing management role 208, analyzes custom resource definition 302 and configuration table 902 corresponding to main operator 202 to determine which sub-operator (i.e., sub-operator 1 504) should be launched. Then, main operator 202, utilizing management role 208, automatically launches sub-operator 1 504 by creating corresponding sub-subscription 904.

Figure 10B:
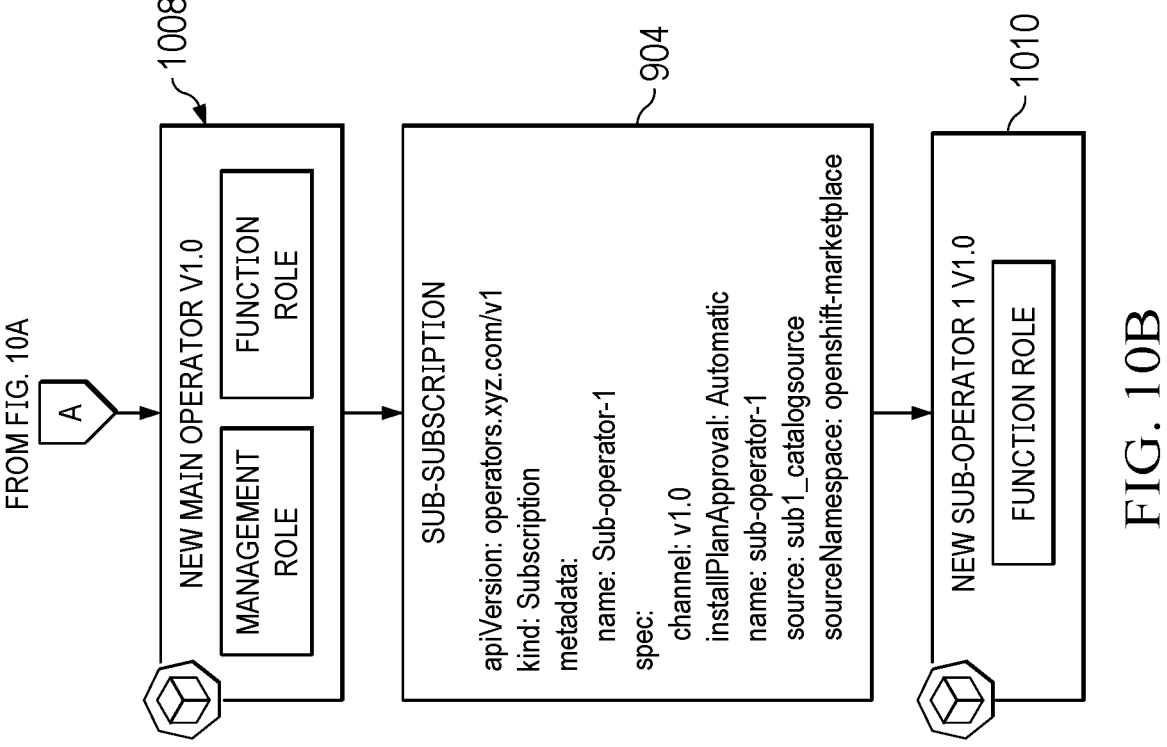

With reference now to FIGS. 10A-10B, a diagram illustrating an example of a main operator upgrade process is depicted in accordance with an illustrative embodiment.

Main operator upgrade process 1000 is implemented in main operator 202, which includes management role 208 and function role 210.

For main operator upgrade, when main operator 202 detects that the version identified in custom resource definition 302, which corresponds to main operator 202, does not match the current version of main operator 202, main operator 202 first retrieves and applies new catalog source file 1002 that defines main operator 202. Then, main operator 202 updates channel 1004, which maps to the correct version of main operator 202, in subscription 1006 of main operator 202. Updating channel 1004 in subscription 1006 automatically terminates the current version of main operator 202 and launches new main operator version 1008. Moreover, new main operator version 1008 then updates sub-subscription 904 of new sub-operator 1 version 1010 to match subscription 1006 of new main operator version 1008.

Figure 11:
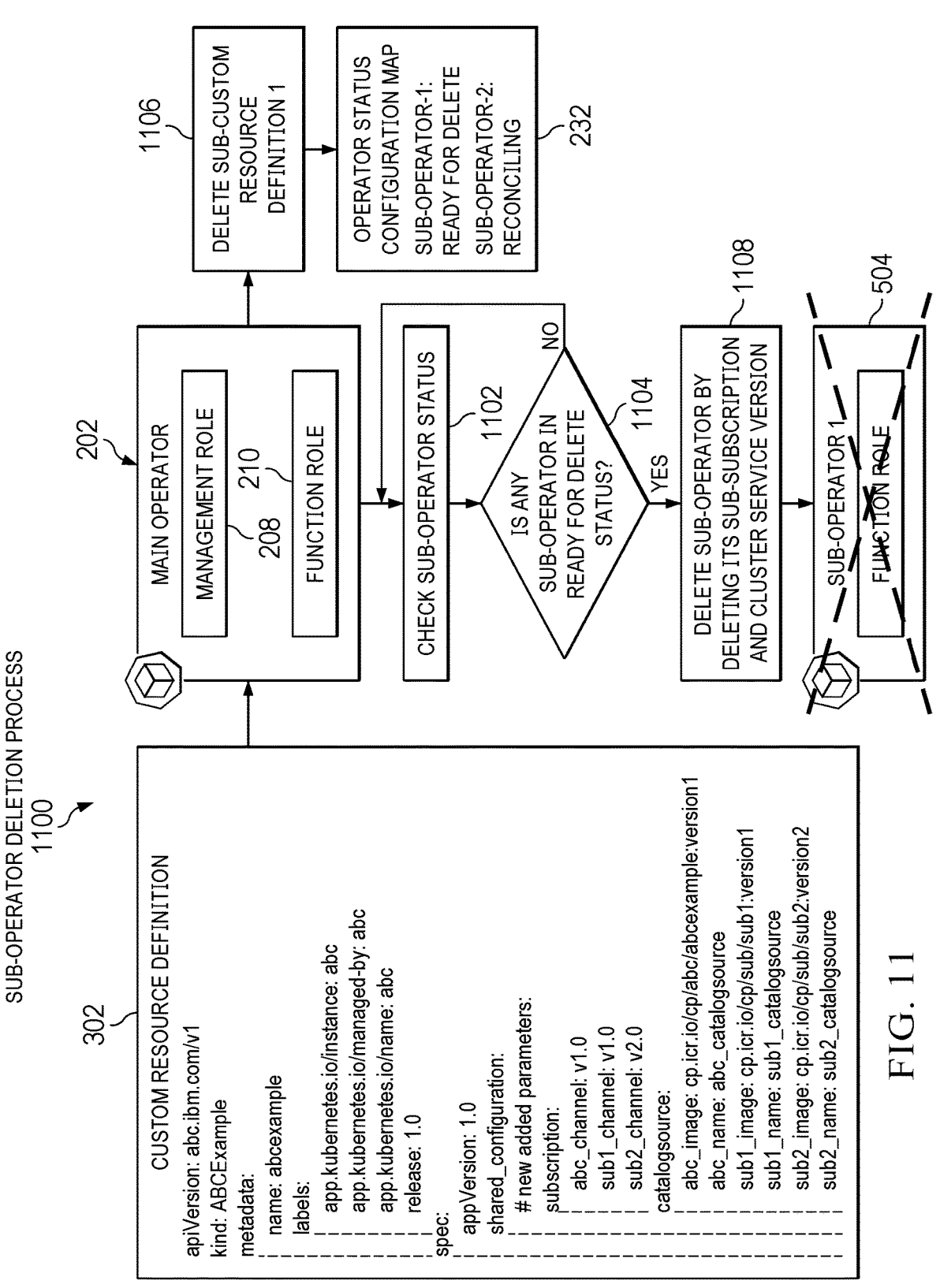
FIG. 11 is a diagram illustrating an example of a sub-operator deletion process in accordance with an illustrative embodiment.

With reference now to FIG. 11, a diagram illustrating an example of a sub-operator deletion process is depicted in accordance with an illustrative embodiment. Sub-operator deletion process 1100 is implemented in main operator 202, which includes management role 208 and function role 210. It should be noted that operator lifecycle management code 200 in FIG. 1 cannot automatically delete main operator 202. However, main operator 202 can automatically delete any sub-operator of main operator 202. For example, main operator 202 can delete a sub-operator when the status of that sub-operator is "ready for delete".

At 1102, main operator 202, using management role 208, checks sub-operator status in operator status configuration map 232 on a predetermined time interval basis. At 1104, if main operator 202 determines that no sub-operator of main operator 202 is in the ready for delete status, then main operator 202 continues to check sub-operator status. At 1104, if main operator 202 determines that a particular sub-operator (i.e., sub-operator 1 504) of main operator 202 is in the ready for delete status, then, at 1106, main operator 202, using management role 208, deletes sub-custom resource definition 1 corresponding to sub-operator 1 504. Then, at 1108, main operator 202, using management role 208, deletes sub-operator 1 504 by deleting the sub-subscription and cluster service version corresponding to sub-operator 1 504. A cluster service version is a YAML file generated from operator metadata that assists in running the operator in a cluster and contains information such as operator description, version, and the like.

Figure 12A:
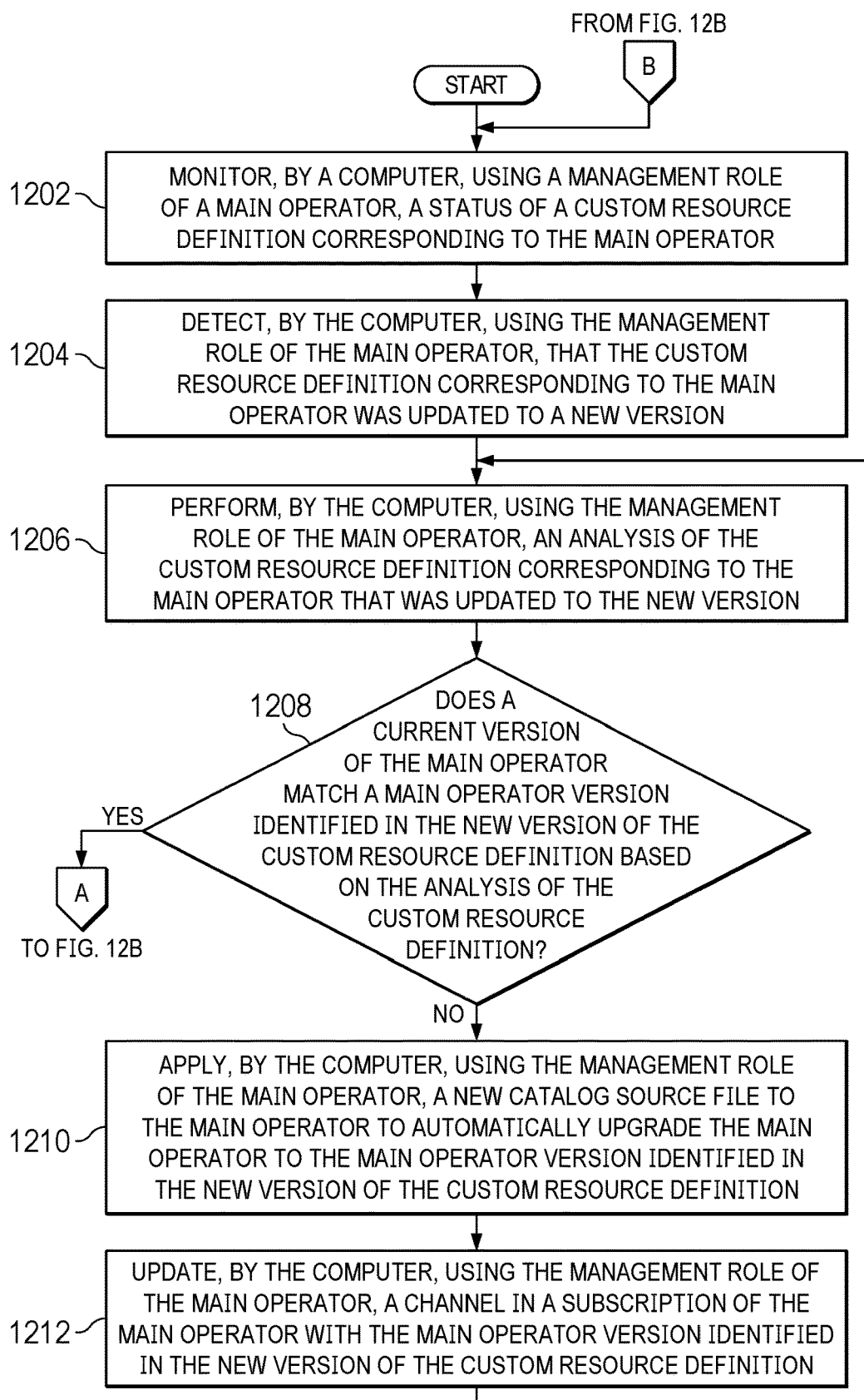

With reference now to FIGS. 12A-12B, a flowchart illustrating a process for providing self-managed operators is shown in accordance with an illustrative embodiment. The process shown in FIGS. 12A-12B may be implemented in a computer, such as, for example, computer 101 in FIG. 1 or host node 204 in FIG. 2. For example, the process shown in FIGS. 12A-12B may be implemented by operator lifecycle management code 200 in FIG. 1.

The process begins when the computer, using a management role of a main operator, monitors a status of a custom resource definition corresponding to the main operator based on a user-defined time interval (step 1202). The main operator is located on the computer. The computer, using the management role of the main operator, detects that the custom resource definition corresponding to the main operator was updated to a new version based on monitoring the status of the custom resource definition (step 1204). The computer, using the management role of the main operator, performs an analysis of the custom resource definition corresponding to the main operator that was updated to the new version (step 1206).

The computer, using the management role of the main operator, makes a determination as to whether a current version of the main operator matches a main operator version identified in the new version of the custom resource definition based on the analysis of the custom resource definition (step 1208). If the computer, using the management role of the main operator, determines that the current version of the main operator does not match the main operator version identified in the new version of the custom resource definition based on the analysis of the custom resource definition, no output of step 1208, then the computer, using the management role of the main operator, applies a new catalog source file, which corresponds to the main operator, to the main operator to automatically upgrade the main operator to the main operator version identified in the new version of the custom resource definition (step 1210). In addition, the computer, using the management role of the main operator, updates a channel in a subscription of the main operator with the main operator version identified in the new version of the custom resource definition (step 1212). Thereafter, the process returns to step 1206.

Returning again to step 1208, if the computer, using the management role of the main operator, determines that the current version of the main operator does match the main operator version identified in the new version of the custom resource definition based on the analysis of the custom resource definition, yes output of step 1208, then the computer, using the management role of the main operator, selects a set of sub-operators that the main operator depends on from a plurality of predefined sub-operators based on the analysis of the new version of the custom resource definition (step 1214). Further, the computer, using a function role of the main operator, generates a sub-custom resource definition for each respective sub-operator of the set of sub-operators that the main operator depends on based on the new version of the custom resource definition corresponding to the main operator (step 1216). Furthermore, the computer, using the management role of the main operator, launches the set of sub-operators that the main operator depends on automatically using the sub-custom resource definition of each respective sub-operator of the set of sub-operators (step 1218).

The computer, using the function role of the main operator, manages a set of components of an application that provides a set of services corresponding to the main operator and the set of sub-operators that the main operator depends on (step 1220). The computer, using the function role of the main operator, records a status of the main operator in an operator status configuration map (step 1222). Thereafter, the process returns to step 1202.

Figure 13:
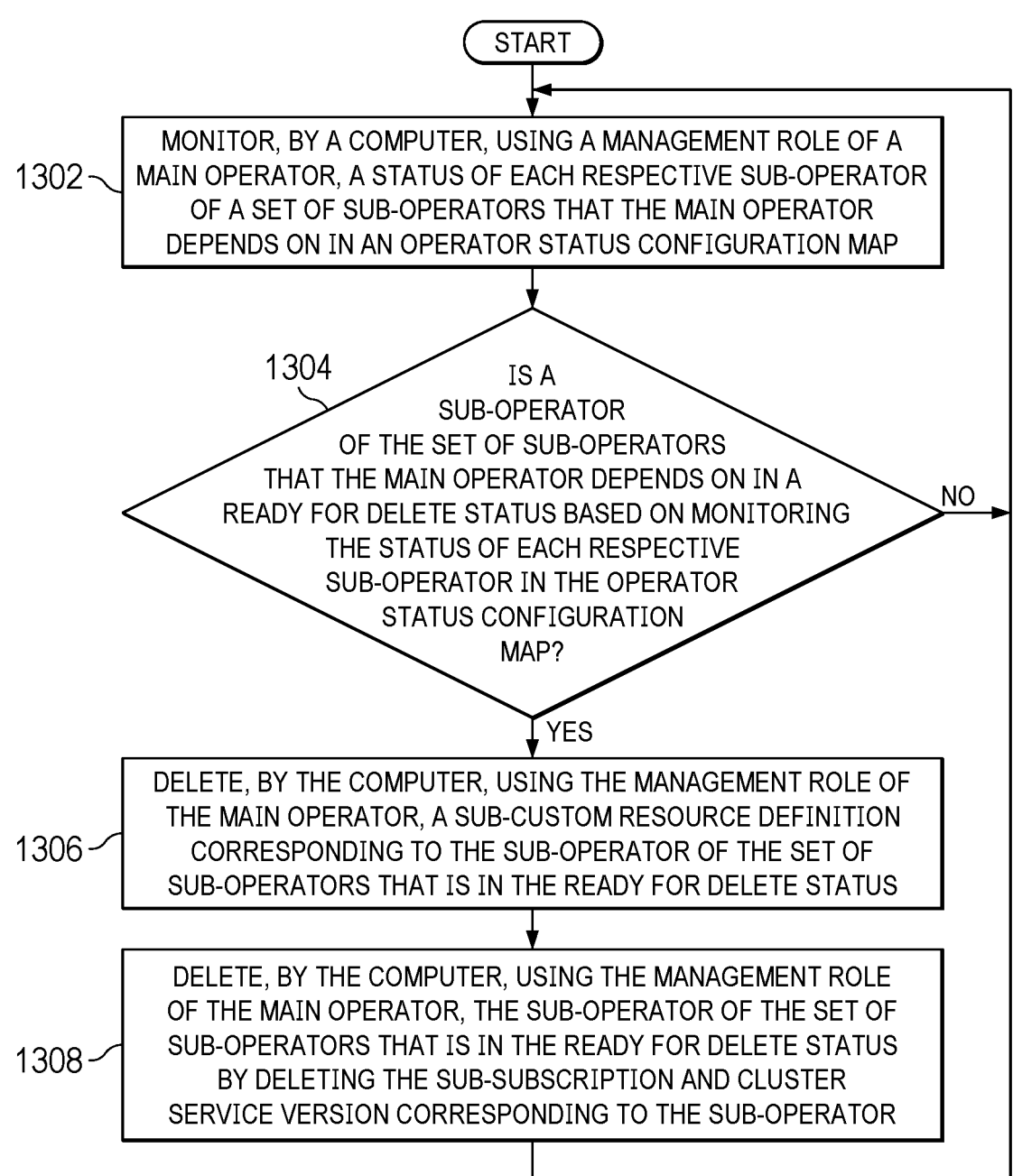
FIG. 13 is a flowchart illustrating a process for sub-operator deletion in accordance with an illustrative embodiment.

With reference now to FIG. 13, a flowchart illustrating a process for sub-operator deletion is shown in accordance with an illustrative embodiment. The process shown in FIG. 13 may be implemented in a computer, such as, for example, computer 101 in FIG. 1 or host node 204 in FIG. 2. For example, the process shown in FIG. 13 may be implemented by operator lifecycle management code 200 in FIG. 1.

The process begins when the computer, using a management role of a main operator, monitors a status of each respective sub-operator of a set of sub-operators that the main operator depends on in an operator status configuration map (step 1302). The computer, using the management role of the main operator, makes a determination as to whether a sub-operator of the set of sub-operators that the main operator depends on is in a ready for delete status based on monitoring the status of each respective sub-operator in the operator status configuration map (step 1304).

If the computer, using the management role of the main operator, determines that no sub-operator of the set of sub-operators that the main operator depends on is in the ready for delete status based on the monitoring of the status of each respective sub-operator in the operator status configuration map, no output of step 1304, then the process returns to step 1302. If the computer, using the management role of the main operator, determines that a sub-operator of the set of sub-operators that the main operator depends on is in the ready for delete status based on the monitoring of the status of each respective sub-operator in the operator status configuration map, yes output of step 1304, then the computer, using the management role of the main operator, deletes a sub-custom resource definition corresponding to the sub-operator of the set of sub-operators that is in the ready for delete status (step 1306). Then, the computer, using the management role of the main operator, deletes the sub-operator of the set of sub-operators that is in the ready for delete status by deleting a sub-subscription and cluster service version corresponding to the sub-operator (step 1308). Thereafter, the process returns to step 1302.

Thus, illustrative embodiments of the present disclosure provide a computer-implemented method, computer system, and computer program product for enabling self-managing operators. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for providing self-managed operators, the computer-implemented method comprising:

responsive to a computer, using a management role of a main operator, determining that a current version of the main operator does match a main operator version identified in a new version of a custom resource definition corresponding to the main operator based on an analysis of the custom resource definition, selecting, by the computer, using the management role of the main operator, a set of sub-operators that the main operator depends on from a plurality of predefined sub-operators based on the analysis of the new version of the custom resource definition;

generating, by the computer, using a function role of the main operator, a sub-custom resource definition for each respective sub-operator of the set of sub-operators that the main operator depends on based on the new version of the custom resource definition corresponding to the main operator; and launching, by the computer, using the management role of the main operator, the set of sub-operators that the main operator depends on automatically using the sub-custom resource definition of each respective sub-operator of the set of sub-operators.

2. The computer-implemented method of claim 1, further comprising:

detecting, by the computer, using the management role of the main operator, that the custom resource definition corresponding to the main operator was updated to the new version;

performing, by the computer, using the management role of the main operator, the analysis of the custom resource definition corresponding to the main operator that was updated to the new version; and determining, by the computer, using the management role of the main operator, whether the current version of the main operator matches the main operator version identified in the new version of the custom resource definition based on the analysis of the custom resource definition.

3. The computer-implemented method of claim 1, further comprising:

responsive to the computer, using the management role of the main operator, determining that the current version of the main operator does not match the main operator version identified in the new version of the custom resource definition based on the analysis of the custom resource definition corresponding to the main operator, applying, by the computer, using the management role of the main operator, a new catalog source file to the main operator to automatically upgrade the main operator to the main operator version identified in the new version of the custom resource definition; and updating, by the computer, using the management role of the main operator, a channel in a subscription of the main operator with the main operator version identified in the new version of the custom resource definition.

4. The computer-implemented method of claim 1, further comprising:

managing, by the computer, using the function role of the main operator, a set of components of an application that provides a set of services corresponding to the main operator and the set of sub-operators that the main operator depends on; and recording, by the computer, using the function role of the main operator, a status of the main operator in an operator status configuration map.

5. The computer-implemented method of claim 1, further comprising:

monitoring, by the computer, using the management role of the main operator, a status of each respective sub-operator of the set of sub-operators that the main operator depends on in an operator status configuration map; and determining, by the computer, using the management role of the main operator, whether a sub-operator of the set of sub-operators that the main operator depends on is in a ready for delete status based on the monitoring of the status of each respective sub-operator in the operator status configuration map.

6. The computer-implemented method of claim 5, further comprising:

responsive to the computer, using the management role of the main operator, determining that the sub-operator of the set of sub-operators that the main operator depends on is in the ready for delete status based on the monitoring of the status of each respective sub-operator in the operator status configuration map, deleting, by the computer, using the management role of the main operator, a sub-custom resource definition corresponding to the sub-operator of the set of sub-operators that is in the ready for delete status; and deleting, by the computer, using the management role of the main operator, the sub-operator of the set of sub-operators that is in the ready for delete status by deleting a sub-subscription and cluster service version corresponding to the sub-operator.

7. The computer-implemented method of claim 1, wherein the management role automatically launches the set of sub-operators without launching any other sub-operators of the plurality of predefined sub-operators preventing unnecessary resource consumption by any of the other sub-operators.

8. The computer-implemented method of claim 1, wherein the custom resource definition corresponding to the main operator includes added parameters of subscription and catalog source that contain information needed for the main operator to automatically upgrade to a newer version and launch sub-operator dependencies.

9. A computer system for providing self-managed operators, the computer system comprising:

a communication fabric;

a set of computer-readable storage media connected to the communication fabric, wherein the set of computer-readable storage media collectively stores program instructions; and a set of processors connected to the communication fabric, wherein the set of processors executes the program instructions to:

select, using a management role of a main operator, a set of sub-operators that a main operator depends on from a plurality of predefined sub-operators based on an analysis of a new version of a custom resource definition in response to determining that a current version of the main operator does match a main operator version identified in the new version of the custom resource definition corresponding to the main operator based on the analysis of the custom resource definition;

generate, using a function role of the main operator, a sub-custom resource definition for each respective sub-operator of the set of sub-operators that the main operator depends on based on the new version of the custom resource definition corresponding to the main operator; and launch, using the management role of the main operator, the set of sub-operators that the main operator depends on automatically using the sub-custom resource definition of each respective sub-operator of the set of sub-operators.

10. The computer system of claim 9, wherein the set of processors further executes the program instructions to:

detect, using the management role of the main operator, that the custom resource definition corresponding to the main operator was updated to the new version;

perform, using the management role of the main operator, the analysis of the custom resource definition corresponding to the main operator that was updated to the new version; and determine, using the management role of the main operator, whether the current version of the main operator matches the main operator version identified in the new version of the custom resource definition based on the analysis of the custom resource definition.

11. The computer system of claim 9, wherein the set of processors further executes the program instructions to:

apply, using the management role of the main operator, a new catalog source file to the main operator to automatically upgrade the main operator to the main operator version identified in the new version of the custom resource definition in response to determining that the current version of the main operator does not match the main operator version identified in the new version of the custom resource definition based on the analysis of the custom resource definition corresponding to the main operator; and update, using the management role of the main operator, a channel in a subscription of the main operator with the main operator version identified in the new version of the custom resource definition.

12. The computer system of claim 9, wherein the set of processors further executes the program instructions to:

manage, using the function role of the main operator, a set of components of an application that provides a set of services corresponding to the main operator and the set of sub-operators that the main operator depends on; and record, using the function role of the main operator, a status of the main operator in an operator status configuration map.

13. The computer system of claim 9, wherein the set of processors further executes the program instructions to:

monitor, using the management role of the main operator, a status of each respective sub-operator of the set of sub-operators that the main operator depends on in an operator status configuration map; and determine, using the management role of the main operator, whether a sub-operator of the set of sub-operators that the main operator depends on is in a ready for delete status based on monitoring the status of each respective sub-operator in the operator status configuration map.

14. The computer system of claim 13, wherein the set of processors further executes the program instructions to:

delete, using the management role of the main operator, a sub-custom resource definition corresponding to the sub-operator of the set of sub-operators that is in the ready for delete status in response to determining that the sub-operator of the set of sub-operators that the main operator depends on is in the ready for delete status based on the monitoring of the status of each respective sub-operator in the operator status configuration map; and delete, using the management role of the main operator, the sub-operator of the set of sub-operators that is in the ready for delete status by deleting a sub-subscription and cluster service version corresponding to the sub-operator.

15. A computer program product for providing self-managed operators, the computer program product comprising a set of computer-readable storage media having program instructions collectively stored therein, the program instructions executable by a computer to cause the computer to:

select, using a management role of a main operator, a set of sub-operators that a main operator depends on from a plurality of predefined sub-operators based on an analysis of a new version of a custom resource definition in response to determining that a current version of the main operator does match a main operator version identified in the new version of the custom resource definition corresponding to the main operator based on the analysis of the custom resource definition;

generate, using a function role of the main operator, a sub-custom resource definition for each respective sub-operator of the set of sub-operators that the main operator depends on based on the new version of the custom resource definition corresponding to the main operator; and launch, using the management role of the main operator, the set of sub-operators that the main operator depends on automatically using the sub-custom resource definition of each respective sub-operator of the set of sub-operators.

16. The computer program product of claim 15, wherein the program instructions further cause the computer to:

detect, using the management role of the main operator, that the custom resource definition corresponding to the main operator was updated to the new version;

perform, using the management role of the main operator, the analysis of the custom resource definition corresponding to the main operator that was updated to the new version; and determine, using the management role of the main operator, whether the current version of the main operator matches the main operator version identified in the new version of the custom resource definition based on the analysis of the custom resource definition.

17. The computer program product of claim 15, wherein the program instructions further cause the computer to:

apply, using the management role of the main operator, a new catalog source file to the main operator to automatically upgrade the main operator to the main operator version identified in the new version of the custom resource definition in response to determining that the current version of the main operator does not match the main operator version identified in the new version of the custom resource definition based on the analysis of the custom resource definition corresponding to the main operator; and update, using the management role of the main operator, a channel in a subscription of the main operator with the main operator version identified in the new version of the custom resource definition.

18. The computer program product of claim 15, wherein the program instructions further cause the computer to:

manage, using the function role of the main operator, a set of components of an application that provides a set of services corresponding to the main operator and the set of sub-operators that the main operator depends on; and record, using the function role of the main operator, a status of the main operator in an operator status configuration map.

19. The computer program product of claim 15, wherein the program instructions further cause the computer to:

monitor, using the management role of the main operator, a status of each respective sub-operator of the set of sub-operators that the main operator depends on in an operator status configuration map; and determine, using the management role of the main operator, whether a sub-operator of the set of sub-operators that the main operator depends on is in a ready for delete status based on monitoring the status of each respective sub-operator in the operator status configuration map.

20. The computer program product of claim 19, wherein the program instructions further cause the computer to:

delete, using the management role of the main operator, a sub-custom resource definition corresponding to the sub-operator of the set of sub-operators that is in the ready for delete status in response to determining that the sub-operator of the set of sub-operators that the main operator depends on is in the ready for delete status based on the monitoring of the status of each respective sub-operator in the operator status configuration map; and delete, using the management role of the main operator, the sub-operator of the set of sub-operators that is in the ready for delete status by deleting a sub-subscription and cluster service version corresponding to the sub-operator.

\* \* \* \* \*